Figure 1:
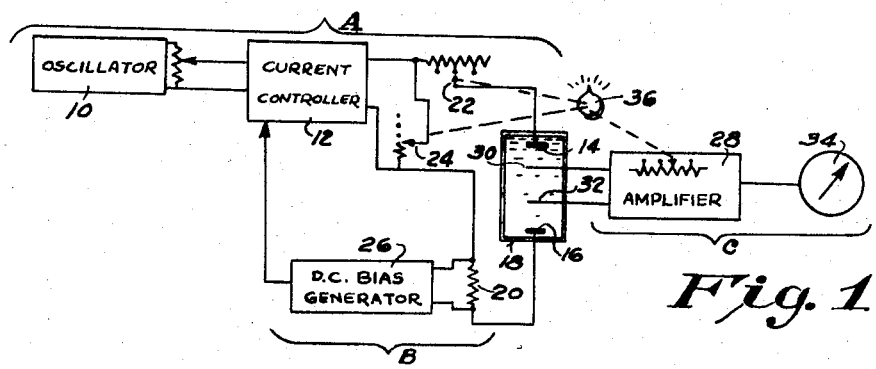

Jan. 27, 1959     L. D. WANN     2,871,446
WIDE-RANGE RESISTANCE AND RESISTIVITY MEASURING APPARATUS
Filed Jan. 28, 1955     2 Sheets-Sheet 1

INVENTOR:
LAYMOND D. WANN

BY Floyd Trimble
ATTORNEY

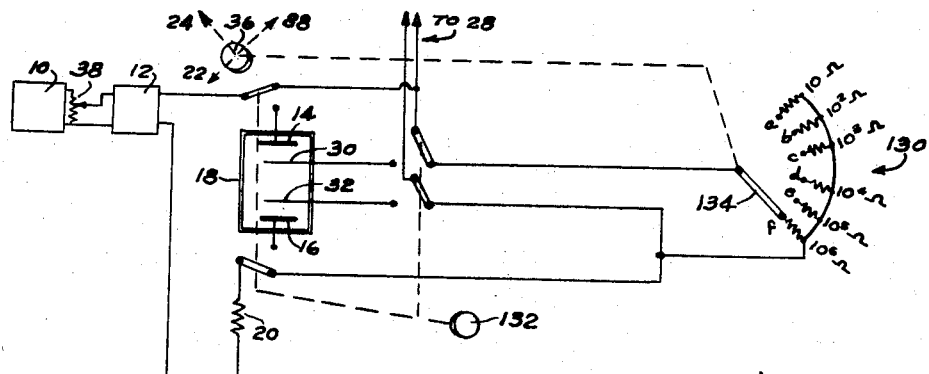
Fig. 3
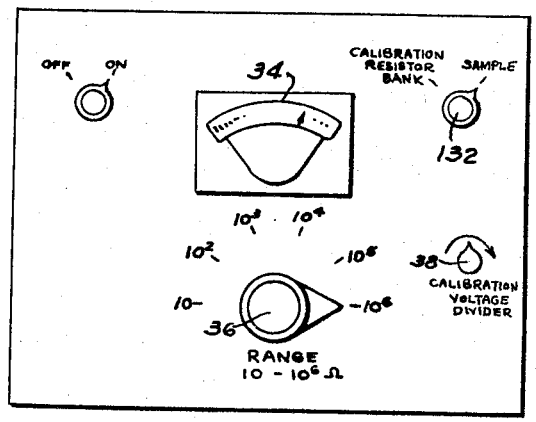
Fig. 4
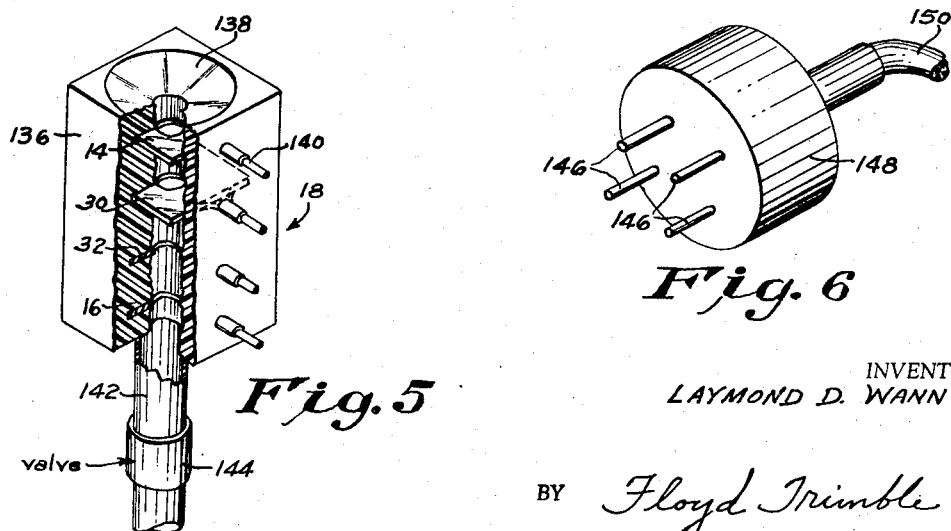
Fig. 5
Fig. 6
INVENTOR:
LAYMOND D. WANN
BY Floyd Trimble
ATTORNEY United States Patent Office 2,871,446
Patented Jan. 27, 1959

2,871,446

WIDE-RANGE RESISTANCE AND RESISTIVITY MEASURING APPARATUS

Laymond D. Wann, Ponca City, Okla., assignor to Continental Oil Company, Ponca City, Okla., a corporation of Delaware Application January 28, 1955, Serial No. 484,669

8 Claims. (Cl. 324—64)

This invention pertains to apparatus for measuring the electrical resistance or resistivity of substances, and is particularly applicable to the measurement and direct indication of the resistivity of liquids, drilling muds and other fluid samples.

Various methods have been proposed for measuring the electrical resistance of materials, some being especially designed for the measurement of materials in the fluid state. As a laboratory proposition, the principles underlying all such proposals are well understood. Thus, the use of current and potential measurements, and the applications of Ohm's law, theoretically provide all of the information which is needed from which to calculate the resistivity of a given sample. Where electrolytic decomposition or polarization would vitiate the results of the simpler techniques, it has also been proposed to utilize alternating current as the means for establishing a current flow through the sample to provide a potential drop from which the resistance may be computed. It has also been realized that the actual value of current flow in the sample may give an incorrect result because of its effect on the material being measured.

The present invention has for its principal object the provision of apparatus by which rapid and accurate measurement of resistance and resistivity can be accomplished, with precision comparable to that attained heretofore only by laboratory measurement, and which novel apparatus is characterized by simplicity, ruggedness and ease of calibration. The satisfactory accomplishment of these aims permits precise measurements of resistivity and resistance under actual field conditions; for example, in the measurement of geological and petrological formations, drilling muds and the like, with dependability and without requiring the services of laboratory technicians. The invention makes possible such measurements with speed and efficiency by field technologists not otherwise specially qualified in the operation of laboratory-standard equipment.

A further object of the invention is to provide apparatus of the above type which is substantially direct-reading; that is, with which values of fluid resistance and resistivity can be obtained without the necessity for computation by the operator. The invention accomplishes this object while placing almost no restriction on the magnitude of resistivity which may be encountered.

An ancillary object of the invention is to provide apparatus having the above characteristics and in which the circuit parameters are automatically adjusted to proper values for optimum precision when the operator makes a single adjustment related to the order of magnitude of the sample resistivity. Such a result requires automatic self-correction properties such as the selection of the circuit constants necessary to provide in the sample a measuring current of constant magnitude regardless of the order of the resistance exhibited by the specimen. At the same time, the novel arrangement provides for an automatic selection of the sensitivity of the measuring circuit, as will appear from the detailed description of the invention which follows.

Still another object is to provide such apparatus with built-in precision calibration means, whereby accurate calibration in any range can be quickly performed, even under field conditions.

Broadly speaking, the invention satisfies the above aims by apparatus comprising three inter-related circuits: (A) a source of constant frequency measuring current, controllable as to current magnitude, for furnishing the measuring current through the cell containing the sample; (B) a direct current bias circuit responsive to the current through the sample or specimen and operative to maintain a predetermined flow of the audio frequency measuring current through the sample; and (C) an amplifier which derives from the potential drop through the cell an electrical signal which when amplified is applied to an indicating voltmeter indicative of the resistance of the sample. The concomitant control of the adjustable parameters of these circuits is an essential novel feature of the present invention.

The terms "resistance" and "resistivity" are used herein in their technical electrical sense, the resistance being expressed in ohms for a particular sample, and resistivity referring to the property of a material represented by the measured resistance of a specimen having a specified geometry, usually in ohm-centimeters.

Figure 2:
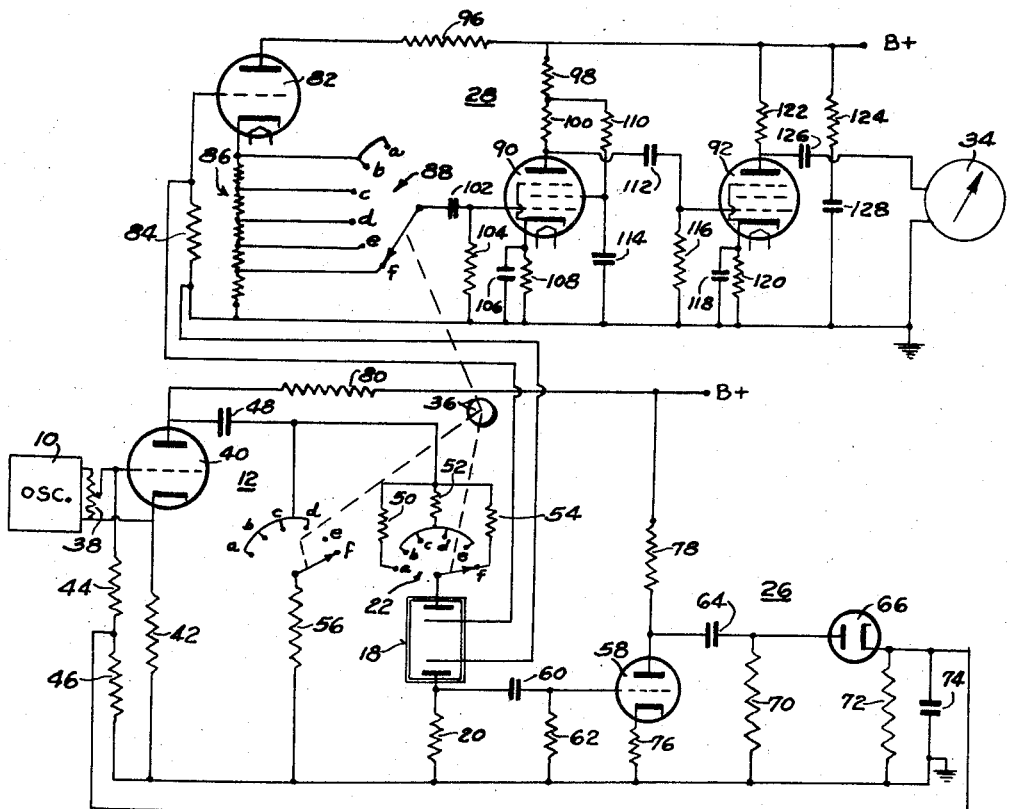

The invention will be understood best by referring now to the following detailed specification of a preferred embodiment thereof, given by way of example and not of limitation, and taken in connection with the appended drawings, in which:

Fig. 1 is a block diagram of a complete apparatus in accordance with the invention, Fig. 2 is a detailed schematic showing the arrangement of the principal components of Fig. 1, Fig. 3 is a circuit schematic disclosing the calibration switching arrangement of the invention, Fig. 4 is a view in elevation of a typical and convenient panel arrangement for the controls of the apparatus, Fig. 5 is a perspective view, parts being broken away, of one form of specimen holder or cell for measuring fluid samples, and Fig. 6 is a similar view of an electrode assembly especially adapted for measuring the resistance of fluid samples by dipping the electrode assembly.

The invention will be described now in connection with a preferred embodiment capable of measuring resistance, at constant sample current, in a range of full-scale values from 10 ohms to a million ohms.

Referring now to Figs. 1 and 2 of the drawings, and especially to Fig. 1, the three basic circuits and their associated range selecting controls are shown in block form as comprising (circuit A) the audio frequency oscillator 10 of fixed frequency, supplying its output to the current regulator 12 whose output in turn is applied to the current electrodes 14, 16 of the cell 18, through a series resistor 20 carrying the full cell current of these electrodes. Adjustable resistors 22 and 24 are shown in series and in shunt relation, respectively, with this cell circuit, for adjustment of the effective cell-circuit impedance in accordance with the known or expected range of resistance of the fluid being tested, which of course is contained within said cell. The adjusting resistors 22 and 24 actually will normally consist of suitable tap switches for selecting from among a group of fixed resistors as will be explained in connection with Fig. 2.

Circuit B of Fig. 1 comprises the bias generator 26 whose input is shunted across resistor 20 and thus varies exactly with the voltage drop thereacross, and hence in accordance with the cell current. The output of the bias generator 26 is applied to the current controller or regulator 12 in a manner to be described below. The final circuit C comprises a voltage amplifier 28 whose input is connected to the potential electrodes 30 and 32 of cell 18, and which drives an indicator such as a voltmeter 34 indicating the resistance or resistivity (in the case of a cell of calibrated dimensions) of the fluid in the cell, directly in ohms. A common control knob 36 is shown as unicontrolling the resistors 22 and 24 and the gain or output of the amplifier 28. Conveniently, as will appear, the knob 36 has its positions or steps marked directly in multiplying factors which are powers of 10, for application to the reading of meter 34.

The reason for unicontrolling the indicated components of circuits A and C is, as has been suggested above, to enable the instrument to be used for measuring resistances in a very wide range of values, while satisfying the requirement for a constant value of current through the cell. To maintain this current value for a wide range of resistances, adjustment of the voltage across the cell must be wide, and to read the potential drop between electrodes 30 and 32 requires a correspondingly wide adjustment in the measuring circuit.

Fig. 2 of the drawings shows the actual circuitry of a preferred embodiment of the apparatus, the same reference numerals being used, so far as possible, to identify similar elements. Considering first circuit A, the oscillator is again indicated by numeral 10, and may comprise a known form of resistance-capacity coupled oscillator having a constant frequency which may be in the range of from 60 to 2,000 cycles per second, this value not being critical. A frequency of 1,000 cycles per second is preferred as giving a good value of discrimination against random electrical noise sources. A voltage output of the order of 10 volts is adequate in the application shown. The output of the oscillator can be selected, for calibration purposes, by the attenuator 38 shown as an adjustable shunt divider resistor, and is applied to the grid-cathode circuit of current regulator tube 40 forming a part of the control circuit 12. For a reason which will appear, the grid bias for tube 40 is obtained by a set of three resistors 42, 44 and 46, the lower ends of resistors 42 and 46 being connected, along with other tube cathodes and components of the apparatus, to a common or grounded return lead which may consist of the chassis of the apparatus.

It will be understood by those skilled in electronic circuitry that regulated direct current anode supplies (300 volts, D. C., for example) for all of the vacuum tubes shown are provided in the well-known manner, the positive terminal of such supply being indicated by the legend "B+," and the negative terminal being returned to the chassis or other common or grounded conductor. For portable use, batteries may be used for both plate and cathode heater circuits.

Tube 40 acts as a variable amplification device and buffer, serving to regulate the current in cell 18 to a fixed value regardless of the cell or sample resistance, and also to prevent changes in the cell contents or circuit adjustments from reacting upon the output circuit of oscillator 10 to alter its frequency. The amplified audio frequency output of tube 40 is coupled through condenser 48 to the resistances 50, 52 and 54, of which one is selected by tap switch 22. Corresponding positions of the ganged tap switches are indicated in the drawings by the corresponding letters $a$, $b$, $c$, $d$, $e$ and $f$. In position $a$, switch 22 inserts a series resistance of (in the circuit shown) of 0.56 megohm; in positions $b$, $c$, $d$ and $e$, a series resistance of 5.6 megohms, and in position $f$ a resistance of 5.36 megohms. The output of amplifier tube 40 is also shunted by the shunt resistance 56, having a value of 0.51 megohm, in switch positions $a$, $b$, $c$ and $d$, but the shunt is removed in positions $e$ and $f$. The measuring resistance 20 in series with the cell 18 has a value of 5 megohms. To minimize polarization effects, the circuit is designed to restrict the current density in the cell to the order of $10^{-5}$ amperes per square centimeter of the current electrode surface.

The bias generator portion of Fig. 2, which is again designated as a whole by 26, comprises an amplifier tube 58 having its grid-cathode circuit coupled by capacitor 60 and bias resistor 62 across resistor 20, and its cathode-anode output circuit coupled via condenser 64 to the diode rectifier 66 whose output is applied, over conductor 68, to the point between resistors 44 and 46. The parameters of this circuit are selected so that the corrective voltage drop across resistor 46 alters the bias of tube 40 precisely the amount necessary to keep the current through resistor 20, and hence through the cell, at the preselected constant value having the order indicated above. Actually, therefore, the selection of a measuring range by knob 36 effects a rough circuit adjustment (at tap switches 22 and 24) to establish the correct order of measuring current, by controlling the applied voltage, and the grid bias generator 26 and the current regulator 12 then operate to set the precise value. Only by such an arrangement is it possible to maintain constant sample current over such a wide range of resistance values in the sample; e. g., a range of $10^6$ ohms with good reading accuracy at all points in the range.

The amplifier 28 of Fig. 2 comprises the cathode follower input stage having tube 82 whose grid-cathode circuit includes a high resistance 84 (50 megohms) to avoid appreciable loading of the potential measuring circuit through the cell 18. The output resistance in the cathode return circuit of tube 82 comprises a series string 86 of resistors or a tapped single precision resistor having a total value of 0.083 megohm. The selected tap of switch 88 applies the output voltage to a conventional two-stage A. C. amplifier comprising tubes 90 and 92 whose final voltage output is applied to the voltmeter 34, preferably calibrated in ohms resistance or ohm-centimeters resistivity. Switch 88 is, of course, ganged with switches 22 and 24 for control by the knob 36. The maximum overall gain of the amplifier is of the order of 100,000, for converting the very small voltage variations between the potential electrodes into readable values of resistance at meter 34. The high impedance input of tube 82 prevents reactions from the measuring circuit occurring across the potential electrodes in the cell, and its low impedance output (across its cathode resistor 86) permits reasonable values of precision resistors or the tapped resistor 86 to be used for control by switch 88.

Conventional circuit elements such as anode, load and bias resistors and coupling and by-pass condensers not necessary to be described in detail have been indicated by reference numerals and are here tabulated, together with the components already described, for purposes of completeness:

| Component | function | value or type |
|---|---|---|
| Resistor 20 | measuring | 5 megohms. |
| Resistor 38 | calibrating | divider. |
| Resistor 42 | bias | 1800 ohms. |
| Resistor 44 | bias control | 0.08 megohm. |
| Resistor 46 | do | 0.02 megohm. |
| Resistor 50 | series range adjustment | 0.56 megohm. |
| Resistor 52 | do | 5.6 megohms. |
| Resistor 54 | do | 5.36 megohms. |
| Resistor 56 | shunt range adjustment | 0.51 megohm. |
| Resistor 62 | grid input | 0.1 megohm. |
| Resistor 70 | diode shunt | 0.01 megohm. |
| Resistor 72 | diode load | 10 megohms. |
| Resistor 76 | bias | 1800 ohms. |
| Resistor 78 | plate supply | 0.15 megohm. |
| Resistor 80 | do | 100 megohms. |
| Resistor 84 | grid input | 50 megohms. |
| Resistor 86 | multiplier string | 0.083 megohm total. |
| Resistor 96 | plate supply | 2500 ohms. |
| Resistor 98 | do | 0.05 megohm. |
| Resistor 100 | do | 100 megohms. |
| Resistor 104 | grid input | 0.5 megohm. |
| Resistor 108 | bias | 56 ohms. |
| Resistor 110 | screen grid supply | 0.39 megohm. |
| Resistor 116 | grid input | 0.015 megohm. |
| Resistor 120 | bias | 56 ohms. |
| Resistor 122 | plate supply | 0.1 megohm. |
| Resistor 124 | screen grid supply | 0.5 megohm. |
| Condenser 48 | coupling | 0.03 microfarad. |

| Component | function | value or type |
|---|---|---|
| Condenser 60 | coupling | 0.1 microfarad. |
| Condenser 64 | do | 0.5 microfarad. |
| Condenser 74 | by-pass | 1.0 microfarad. |
| Condenser 102 | coupling | 0.05 microfarad. |
| Condenser 106 | by-pass | 25 microfarads. |
| Condenser 112 | coupling | 0.005 microfarad. |
| Condenser 114 | by-pass | 0.05 microfarad. |
| Condenser 118 | do | 25 microfarads. |
| Condenser 126 | coupling | 0.005 microfarad. |
| Condenser 128 | by-pass | 0.05 microfarad. |
| Tube 40 | buffer amplifier | RMA Type 6J5. |
| Tube 58 | amplifier | ½ RMA Type 6SN7. |
| Tube 66 | rectifier diode | ½ RMA Type 6H6 or 1N34. |
| Tube 82 | cathode follower | ½ RMA Type 6SN7. |
| Tube 90 | voltage amplifier | RMA Type 6SJ7. |
| Tube 92 | output amplifier | Do. |

The tabulated values can of course be varied widely, without departing from the invention, and other tube types can be employed in suitable circuitry.

*Resistivity range selector*

The selection of a resistivity range to suit the need of any particular sample requires that changes be made in resistance values in both the cathode follower stage 82 of amplifier 28, and the current control 12 to cell 18 circuits. This change-over is conveniently and simultaneously accomplished by the ganged switches 22, 24 and 28. A given gang switch position provides a combination of resistor values as shown in Figure 2 to provide a resistivity measurement within the ranges shown in the following table:

| Gang Switch Position | Resistivity Range, Ohms (or Ohm-centimeters) |
|---|---|
| a | 0–10 |
| b | 0–100 |
| c | 0–1,000 |
| d | 0–10,000 |
| e | 0–100,000 |
| f | 0–1,000,000 |

For example the circuit adjusted as shown in Figure 2 with the switches set at positions $f$ is intended for a sample having a resistance between 100,000 and 1,000,000 ohms.

*Calibration of apparatus*

Calibration of the apparatus consists in replacing the sample cell 18 with a standard resistor of $10_n$ ohms ($n$ being a whole number of from 1 to 6), setting the resistance range selector 36 to a like resistance value, and then adjusting the input voltage to current controller 12 by means of the voltage divider 38 of the oscillator 10 to establish the desired constant current density to be used with a sample. This current density is attained upon adjusting the voltage divider 38 to give a full scale deflection on meter 34. Thereafter, with the sample cell 18 back in the circuit, the apparatus will read directly the resistance in ohms of samples in any of the several resistance ranges of the apparatus. The principles of this calibration will be understood from a consideration of Ohm's law and the design characteristics of the apparatus: In the equation, $$E = IR$$

$R$=the resistance of a standard resistor, say 1,000 ohms, which is substituted for the sample across its pickup electrodes 30 and 32, $I$=the constant current density for which the apparatus is designed, i. e. $10^{-5}$ amperes through the sample, as indicated by full scale meter deflection in calibration to the standard resistor. Substituting in the equation, the potential drop $E$ of the sample between its pickup electrodes as represented by the standard 1,000 ohm-resistor, it becomes:

$$E = 10^{-5} \times 10^3 = 10^{-2} \text{ volts}$$

The potential drop $E$ is a proportional measure of the resistance $R$ of the sample at the constant current density. $E$ is translated to the corresponding resistance value by the numerical gain factor designed into amplifier 28 which precedes the meter 34; this factor is $10^5$. Resistance, $R_m$, as read on the meter is seen from the following equation:

$$R_m = 10^5 E = 10^5 \times 10^{-2} = 1,000 \text{ ohms}$$

Hence it will be seen that the meter reading at full scale corresponds to the value of the standard resistor used for calibration. Note that if another standard, say $10^6$ ohms, is used and the range selector of the apparatus is set accordingly, $I$ remains constant at $10^{-5}$ ampere and the meter remains at full deflection for a reading of $10^6$ ohms, etc.

As described above, the apparatus is calibrated to read the apparent resistivity of the sample. Apparent resistivity, $R_a$, is related to true sensitivity, $R_t$, by the following equation taking into account the cell constant, $k$ of the sample holder:

$$R_t = R_a A/L = R_a k$$

wherein $A$=cross-sectional area of the sample normal to the electrode axis or current path, and $L$=distance between the electrodes (pickup electrodes 30 and 32). $A$ and $L$ for a given sample cell remain constant, hence, $A/L=k$, which for a particular cell which has been used, is, $k=0.8$. To secure true resistivity readings with this cell, it is only necessary during calibration to adjust voltage divider 38 so that the meter reading will be 0.8 of full scale deflection. This illustrates another advantage of this apparatus in providing complete automatic control and compensation for any factor in securing a rapid direct reading.

Since the apparatus is designed for a high degree of stability in operation, calibration as described need be employed only to compensate for normal effects of aging from use upon its components, particularly the tubes employed therein.

Rather than using a single standard resistor, it is found more convenient to provide a bank of standard resistors, one for each resistivity range, the values of which are respectively equal to the maximum resistance of each range, and to build these into the apparatus, with a "calibration" switch, for convenient field calibration. The choice of a standard resistor for any given resistivity range is made automatic by ganging a standard resistor selector switch with the range selector switch 36 of the apparatus. This preferred means for calibration, as schematically shown in Figure 3, is operated as follows: Standard resistor bank 130 replaces sample cell 18 in the circuit by means of ganged two position switches controlled by knob 132. Resistor selector switch 134 is ganged with resistivity range selector control 36. In the specific embodiment of the invention shown in Fig. 3 the values of the six standard resistors shown are respectively, 10, 100, 1,000, 10,000, 100,000, and 1,000,000 ohms. As shown, the resistivity range of the apparatus is set at $0$–$10^6$ ohms and the $10^6$ ohm standard resistor is in circuit therewith. To calibrate, it is only necessary now to adjust voltage divider 38 to the desired full scale deflection, or cell constant deflection, on meter 34. The apparatus is readied for a sample measurement by returning switch-over 132 to the sample cell position.

Thus calibrated, it is only necessary to place a sample in the cell 18, set the resistivity range selector, and directly observe its resistance measurement on meter 34.

After calibration, operation of knob 132 (Fig. 3) to its "read" position restores the switches to position for making measurements on a sample.

By the means described, precise calibrations can be carried out even under field conditions, and without the necessity of carrying auxiliary items outside the integral cabinet of the testing apparatus.

Fig. 4 of the drawings shows a suitable panel layout for the various controls and the meter 34, for ready calibration and operation.

A preferred form of measuring or sample cell for use with liquids or fluids is illustrated in broken-away perspective in Fig. 5, the same being again designated generally by numeral 18 and shown as comprising a unitary block 136 of insulating material having a central bore connecting with a funnel-shaped recess 138 on its upper surface, to permit a fluid sample to be introduced into the bore. The electrodes 14, 16, 30 and 32 are shown as metal plates perforated concentrically with the bore of the block 136 and each provided with a terminal lead or connection such as at 140 passing through the block's outer surface. A discharge conduit or duct 142 connects with the lower end of the bore, and may be provided with a valve 144 to permit the contents of the cell to be drained away. Such a unitary assembly is rugged and yet provides precise dimensions from which the resistivity can be accurately determined by the calibrations described above.

In Fig. 6 an alternate form of "cell" is shown, the same being constituted actually by a set of projecting current and potential electrodes 146 carried by an insulating body 148, and adapted to be used by immersion or dipping in more solid or viscous specimens. The leads are cabled as at 150 for connection to the measuring apparatus.

While particular embodiments of the invention have been described, it will be understood, of course, that the invention is not limited thereto, since many modifications can be made, and it is, therefore, contemplated to cover by the appended claims any such modifications as fall within the true spirit and scope of the invention.

The invention having thus been described, what is claimed and desired to be secured by Letters Patent is:

1. In apparatus for the measurement of the electrical resistance of a specimen, a supply circuit for applying to said specimen a voltage to produce a current flow therethrough, automatic means for adjusting said supply circuit in accordance with the current through said specimen to maintain said current at a constant predetermined value, a measuring circuit connected to said specimen for measuring the voltage drop thereacross produced by said current, and means for adjusting simultaneously the supply circuit voltage and the sensitivity of said measuring circuit.

2. In apparatus for the measurement of the electrical resistance of a specimen, a supply circuit for applying to said specimen a voltage to produce a current flow therethrough, automatic means for adjusting said supply circuit in accordance with the current through said specimen to maintain said current at a constant predetermined value, a measuring circuit connected to said specimen for measuring the voltage drop thereacross produced by said current, and manually operable switch means for adjusting simultaneously the sensitivity of said measuring circuit and the approximate value of the supply circuit voltage in accordance with the approximate resistance of the specimen, to produce a current flow within the control range of said automatic means.

3. In apparatus for the measurement of the electrical resistance of a specimen, a supply circuit for applying to said specimen an audio frequency alternating voltage to produce a current flow therethrough, automatic means for adjusting said supply circuit in accordance with the current through said specimen to maintain said current at a constant and low predetermined value, a measuring circuit including an alternating current amplifier connected to said specimen for measuring the voltage drop thereacross produced by said current, and decade switch means for adjusting simultaneously the order of the supply circuit voltage and the sensitivity of said measuring circuit.

4. Apparatus for the measurement of the electrical resistance of a specimen, comprising a pair of current electrodes for connection to the specimen, a vacuum tube including at least a cathode, an anode and a control grid and having its anode-cathode path connected through a first fixed resistor in an alternating current circuit to said current electrodes, a source of alternating potential connected between said cathode and said grid, a source of direct current voltage connected between said anode and said cathode through a second fixed resistor, means for deriving from said first fixed resistor a voltage proportional to the current flow between said current electrodes and for applying said derived voltage between said cathode and said control grid to vary the anode-cathode current in such a direction as to maintain constant the current through said first fixed resistor, a pair of potential-sensing electrodes for connection to the specimen, and means for measuring the potential drop between said last-named electrodes to indicate the resistance of the specimen.

5. Apparatus for the measurement of the electrical resistance of a specimen, comprising a pair of current electrodes for connection to the specimen, a vacuum tube including at least a cathode, an anode and a control grid and having its anode-cathode path connected through a first fixed resistor in an alternating current circuit to said current electrodes, a source of alternating potential connected between said cathode and said grid, a source of direct current voltage connected between said anode and said cathode through a second fixed resistor, means for deriving from said first fixed resistor a voltage proportional to the current flow between said current electrodes and for applying said derived voltage between said cathode and said control grid to vary the anode-cathode current in such a direction as to maintain constant the current through said first fixed resistor, a pair of potential-sensing electrodes for connection to the specimen holder, and means including an amplifier and an indicating meter for measuring the potential drop between said last-named electrodes to indicate directly the resistance of the specimen.

6. The combination of claim 5, including a calibrated decade-switch controlled resistor network between said vacuum tube and said current electrodes for effecting a coarse control of the voltage applied to said current electrodes over a wide range of specimen resistance values, and a second switch ganged with a first-named switch for concomitantly adjusting the sensitivity of said potential-drop measuring means in steps to provide a direct indication of resistance.

7. A resistance measuring apparatus comprising a source of voltage variable over a wide range of voltage values, means for applying a voltage from said source to a specimen under test, manual means for adjusting the approximate value of applied voltage to a selected one of several values related to one another by successive powers of the numeral 10, a measuring circuit adapted to measure the voltage drop in said specimen produced by the applied voltage, means for adjusting the sensitivity of said measuring circuit concomitantly with the adjustment of the applied voltage, a plurality of calibrating resistors, a switch for selectively substituting a selected one of said calibrating resistors for the specimen to be tested, and means connected for operation by said manual means for selecting the desired one of said calibrating resistors.

8. A resistance measuring apparatus in accordance with claim 7, including automatic means for adjusting the precise value of the applied voltage to a predetermined constant value irrespective of the setting of said manual means.

References Cited in the file of this patent

UNITED STATES PATENTS

| | | |
|---|---|---|
| 1,983,442 | Drake | Dec. 4, 1934 |
| 2,049,306 | Matson | July 28, 1936 |
| 2,351,201 | Gillis | June 13, 1944 |
| 2,673,327 | Morelock | Mar. 23, 1954 |
| 2,749,512 | Blair | June 5, 1956 |